(12) United States Patent  
Shah

(10) Patent No.: US 9,157,498 B2  
(45) Date of Patent: Oct. 13, 2015

(54) EFFICIENT ENERGY ACCUMULATION ELEMENT FOR ACTUATORS AND OTHER DEVICES

(71) Applicant: ROTEX MANUFACTURERS AND ENGINEERS PRIVATE LIMITED, Maharashtra (IN)

(72) Inventor: Amit Shah, Mumbai (IN)

( * ) Notice: Subject to any disclaimer, the term of this patent is extended or adjusted under 35 U.S.C. 154(b) by 200 days.

(21) Appl. No.: 13/974,075

(22) Filed: Aug. 23, 2013

(65) Prior Publication Data

US 2014/0312544 A1    Oct. 23, 2014

(30) Foreign Application Priority Data

Apr. 18, 2013    (IN) .......................... 1449/MUM/2013

(51) Int. Cl.
  *F16F 1/06*    (2006.01)
  *F16F 1/12*    (2006.01)

(52) U.S. Cl.
  CPC ..................................... *F16F 1/128* (2013.01)

(58) Field of Classification Search
  CPC ............... F16F 1/128; F16F 1/12; F16F 3/04; F16F 15/067; F15B 1/02; F16B 1/02
  USPC ........... 267/170, 179, 182, 70, 72–74, 89, 90, 267/91, 209, 210, 235, 238
  See application file for complete search history.

(56) References Cited

U.S. PATENT DOCUMENTS

| | | | | |
|---|---|---|---|---|
| 2,856,077 A * | 10/1958 | Stanton, Jr. | ............... | 211/119.09 |
| 3,032,605 A * | 5/1962 | Gerlach et al. | ............. | 174/128.1 |
| 3,231,950 A * | 2/1966 | Lummis | .......................... | 24/300 |
| 4,757,853 A * | 7/1988 | Price | ............................. | 160/191 |
| 4,976,417 A * | 12/1990 | Smith | ............................ | 267/25 |
| 5,120,032 A * | 6/1992 | Smith | ............................ | 267/273 |
| 6,062,157 A * | 5/2000 | Derman | ................... | 114/230.24 |
| 8,181,947 B2 * | 5/2012 | Akahori | ........................ | 267/179 |
| 2014/0250878 A1 * | 9/2014 | Shah | .............................. | 60/413 |

* cited by examiner

*Primary Examiner* — Pamela Rodriguez

(57) ABSTRACT

An efficient energy accumulation element comprising a compression spring which uses end caps and flexible rope to pre-compress the spring for using in actuators and other devices. The efficient energy accumulation element is independent of external surfaces or end construction of the spring. The accumulation and release of energy happens noiselessly.

10 Claims, 6 Drawing Sheets

EFFICIENT ENERGY ACCUMULATION ELEMENT FOR ACTUATORS AND OTHER DEVICES

FIELD OF THE INVENTION

The present invention relates to efficient energy accumulation element for actuators and other devices.

OBJECTIVE

The objective is to invent a mechanical energy accumulation element using springs which can be prepared for assembly with ease.

Another objective is to invent a mechanical energy accumulation element using a spring which can be deployed for accumulating higher energy and in which the energy accumulation is independent of the assembly construction.

BACKGROUND OF THE INVENTION

Accumulation and release of mechanical energy is a phenomenon deployed in several devices. Springs are one of the commonest elements used for this purpose. Both compression as well as extension springs are made use of.

For using compression springs, pre-compression is the first pre-requisite. Pre-compression is either achieved by surfaces external to the spring or by constraining the spring modularly. The first method viz. pre-compression by external surfaces requires skillful and time consuming assembly.

The second method viz. modular constraining is described, particularly for actuators in German patent DE 9314412, a U.S. Pat. No. 8,181,947 and also in patent Application WO2010/063514. In all these, the minimum length of cartridge is fixed. So even if the spring can be compressed to the solid length, the limitation of cartridge design does not allow. Further, these methods cannot be used efficiently for varying diameter compression springs which can be otherwise compressed up to coil thickness.

STATEMENT OF INVENTION

Our invention is an efficient energy accumulation compression spring assembled with a flexible yet sturdy rope entangled between two end caps, each cap being fixed at the respective end of the compression spring, allowing the spring to compress to any length up to solid. It is not driven by the stroke needed.

The length of the rope is shorter than the compression spring. The difference in length is according to the pre-compression or energy accumulation required. The end caps entrap the hammer or suitably shaped end of the rope. The spring is ready to be deployed without depending on external surface construction or even spring end construction.

DETAILED DESCRIPTION OF INVENTION

Figure 1:
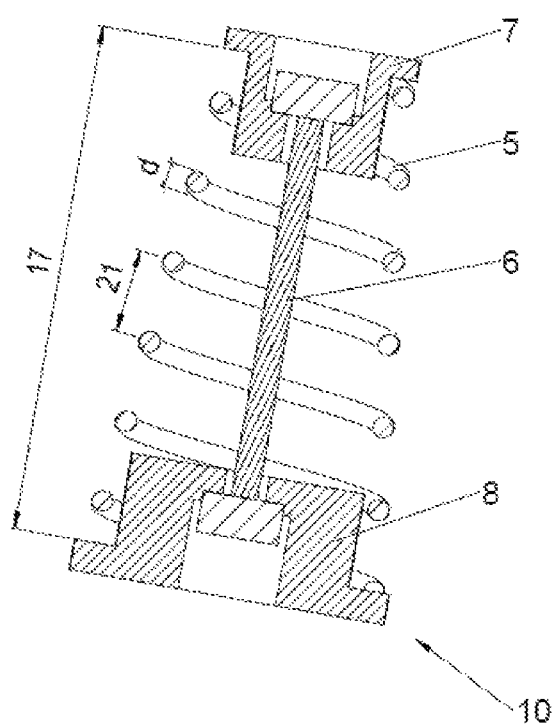
FIG. 1 shows the efficient energy accumulation element of a progressively varying diameter compression spring in a pre-compressed state, ready to be assembled in devices like actuators etc.
Figure 2:
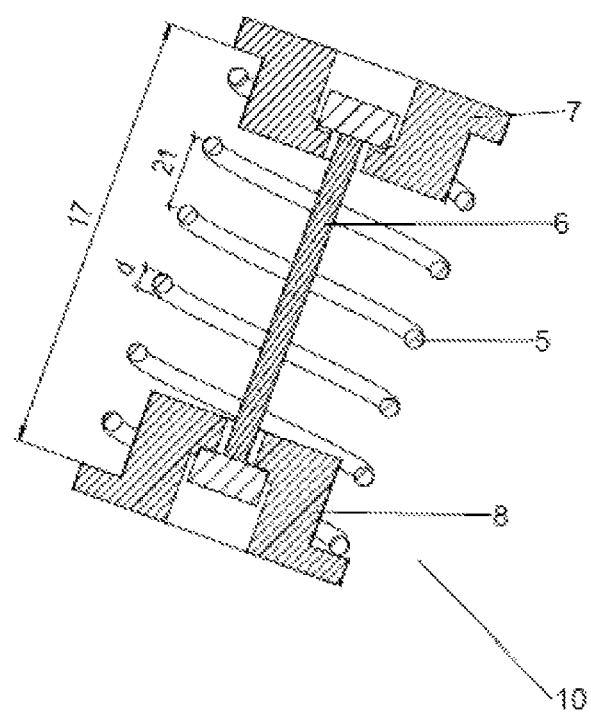
FIG. 2 shows the efficient energy accumulation element of a constant diameter compression spring in pre-compressed state, ready to be assembled in devices like actuators etc.

The preferred embodiment of an efficient energy accumulation compression spring assembled with a flexible yet sturdy rope will now be described in detail, with reference to the accompanying drawings. The terms and expressions which have been used here are merely for description and not for limitation.

Efficient Energy Accumulation Element (10) comprising a compression spring (5), whether having a constant diameter or a varying diameter is pre-compressed by using end caps (7, 8) and the flexible yet sturdy rope (6) having hammer shaped heads at each of its ends. The end caps (7, 8) have a diameter (D1) slightly less than a corresponding outer diameter of the compression spring (5) so that the end caps (7, 8) are simply inserted in the compression spring (5) at spring ends.

Each of the end caps (7 or 8) have a through slot (11) through which the hammer shaped head (13) of the rope (6) is inserted inside the spring (5) and taken out from the end cap (7 or 8) at the other end.

Each of the end caps (7 or 8) have a blind slot (12) substantially at 90 degrees to the through slot (11) in which the hammer shaped heads (13) sits with interference and therefore needs to be pushed in with certain definite force such that it cannot come out without using a screw driver or a tool. The through slot (11) and the blind slot (12) are collectively called an opening construction.

The length (16) of the rope (6) is less than the length (17) of compression spring (5).

To assemble Efficient Energy accumulation element (10) with the compression spring (5), the compression spring is required to be held in a compressed state by any simple device like vice, etc. so that its length becomes less than the length of rope (16). A first hammer shaped head (13) of the rope is inserted from one of the end caps (7) and taken out from another end cap (8), while a second hammer shaped head follows, so that the first hammer shaped head and second hammer shaped head are present at each of the end caps. The Hammer shaped heads (13) i.e. the first hammer shaped head and the second hammer shaped head, within both the end caps (7) and (8) are turned so that the hammer shaped heads (13) sits over the blind slots (12). The compressed spring (5) is then released from the device used for holding it in the compressed state. Due to the compression spring (5) trying to regain its uncompressed state, both the hammer shaped heads (13), which were so far just partially engaged with the blind slots (12) now get fully trapped in the blind slot (12) due to its interfering construction. The compression spring remains compressed corresponding to the length difference between its free length and the effective length of the rope, as calculated & suited for the application. This is also known as the pre-compressed state of the element (10).

Figure 3:
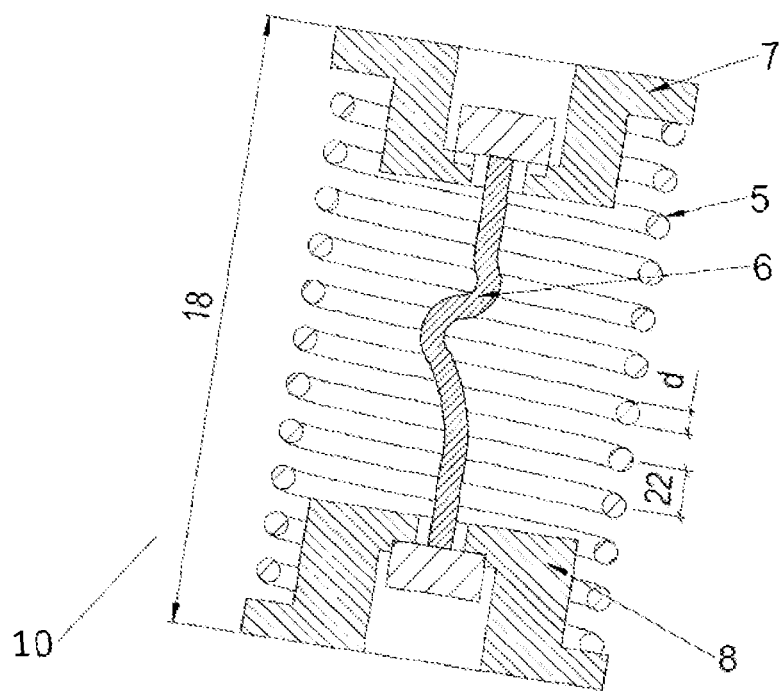
FIG. 3 shows the efficient energy accumulation element in the compressed state, as it becomes during use in the device like actuators etc.
Figure 4:
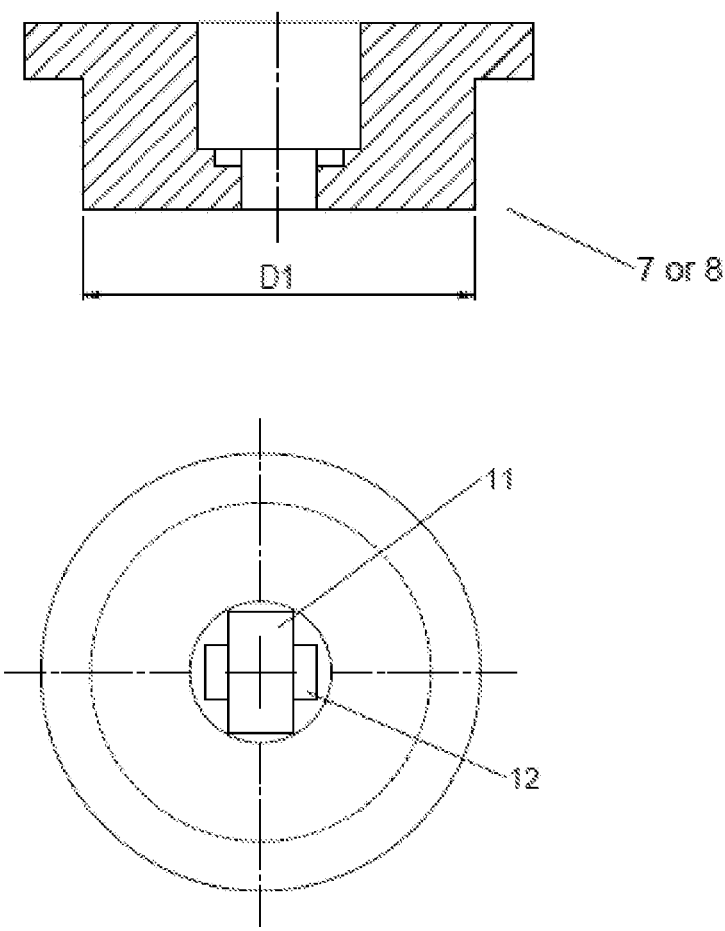
FIG. 4 shows preferred embodiment of construction of end cap.
Figure 5:
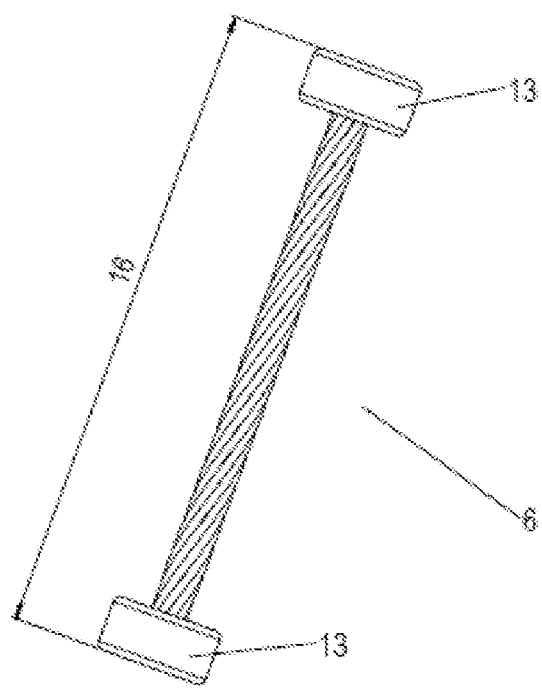
FIG. 5 shows preferred embodiment of construction of flexible rope.
Figure 6:
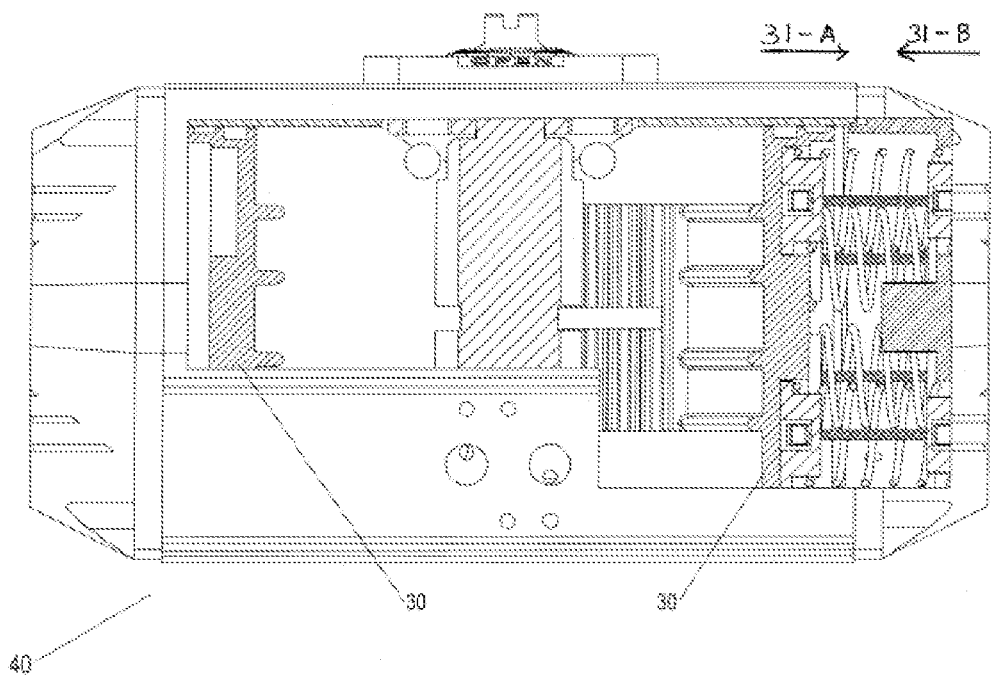
FIG. 6 shows a sectional view of an actuator using the efficient energy accumulation element of the compression spring.

One application described here is actuator (40). When a piston (30) moves in direction 31-A, the efficient energy accumulation element (10) of the compression spring compresses as shown in FIG. 3, and accumulates energy. Since the rope (6) is flexible as shown in FIG. 3, the extent of cumulating energy is possible up to a solid length of the spring or as much as the spring permits. The action of accumulating and releasing energy is free from mechanical noise and does not need lubrication as there are no rubbing components The construction of the through slot (11) and the blind slot (12) of the end caps (7,8) and ends (13) of flexible rope are possible in several ways such that they are assemble-able as described above or in any sequence and therefore the above embodiment is merely a preferred one and not limiting the invention. "Hammer" shape, in other words, is not a limitation of this design but is merely an embodiment and what is important is that the contour of the ends of rope and slots in the end caps are such that the rope can be passed thru' the end cap (7 or 8) as well as trapped in the end cap (7 or 8) as required.

Also, the construction of end caps (7, 8) could be such as to entangle with the spring ends for facilitating assembly.

The flexible yet sturdy rope (6) can be of any material so long as it is flexible to allow spring compression without any limitation due to itself. The term "rope", "flexible rope" and "flexible yet sturdy rope" are used interchangeably.

I claim:

1. An efficient energy accumulation element for actuators and other device comprising:
    a compression spring having a constant diameter or a varying diameter;
    end caps at ends of the compression spring;
    a through slot at each of the end caps;
    a flexible yet sturdy rope having a first hammer shaped head and a second hammer shaped head forming hammer shaped heads at each of its ends; and
    a blind slot at each of the end caps substantially 90 degrees to the through slots in which the hammer shaped heads sit with interference.

2. The efficient energy accumulation element as claimed in claim 1, wherein said end caps are simply inserted in the compression spring at the spring ends or are entangled with the spring ends.

3. The efficient energy accumulation element as claimed in claim 1, wherein said hammer shaped heads of the flexible yet sturdy rope pass through the through slots of the end caps and sit with interference in the blind slots of the end caps.

4. The efficient energy accumulation element as claimed in claim 1, wherein said hammer shaped heads of the flexible yet sturdy rope and correspondingly an opening construction in the end cap is such as to either pass the hammer shaped heads through the through slots or entrap the hammer shaped heads in the blind slots.

5. The efficient energy accumulation element as claimed in claim 1, wherein said flexible yet sturdy rope is shorter in length than the compression spring.

6. The efficient energy accumulation element as claimed in claim 1, wherein said flexible yet sturdy rope when assembled through the end caps keeps the compression spring in a pre-compressed state.

7. The efficient energy accumulation element as claimed in claim 1, wherein said efficient energy accumulation element is assembled in actuators and other devices.

8. The efficient energy accumulation element as claimed in claim 1, wherein said efficient energy accumulation element can be used to accumulate energy up to the limit of the spring.

9. The efficient energy accumulation element as claimed in claim 1, wherein said efficient energy accumulation element operates without noise and need of lubrication.

10. A method to assemble an energy efficient accumulating element, the method comprising the steps of:
    inserting end caps at ends of a compression spring;
    holding the compression spring in a compressed state;
    inserting a first hammer shaped head of a flexible yet sturdy rope from a through slot of one of the end caps;
    taking out the first hammer shaped head of the flexible yet sturdy rope from a through slot of another end cap, while a second hammer shaped head follows, such that the first hammer shaped head and the second hammer shaped head are present at each of the end caps;
    turning both the hammer shaped heads of the flexible yet sturdy rope till the hammer shaped heads sit with an interference in blind slots substantially 90 degrees to the through slots; and
    releasing the compression spring from the compressed state.

* * * * *